United States Patent Office 3,274,077
Patented Sept. 20, 1966

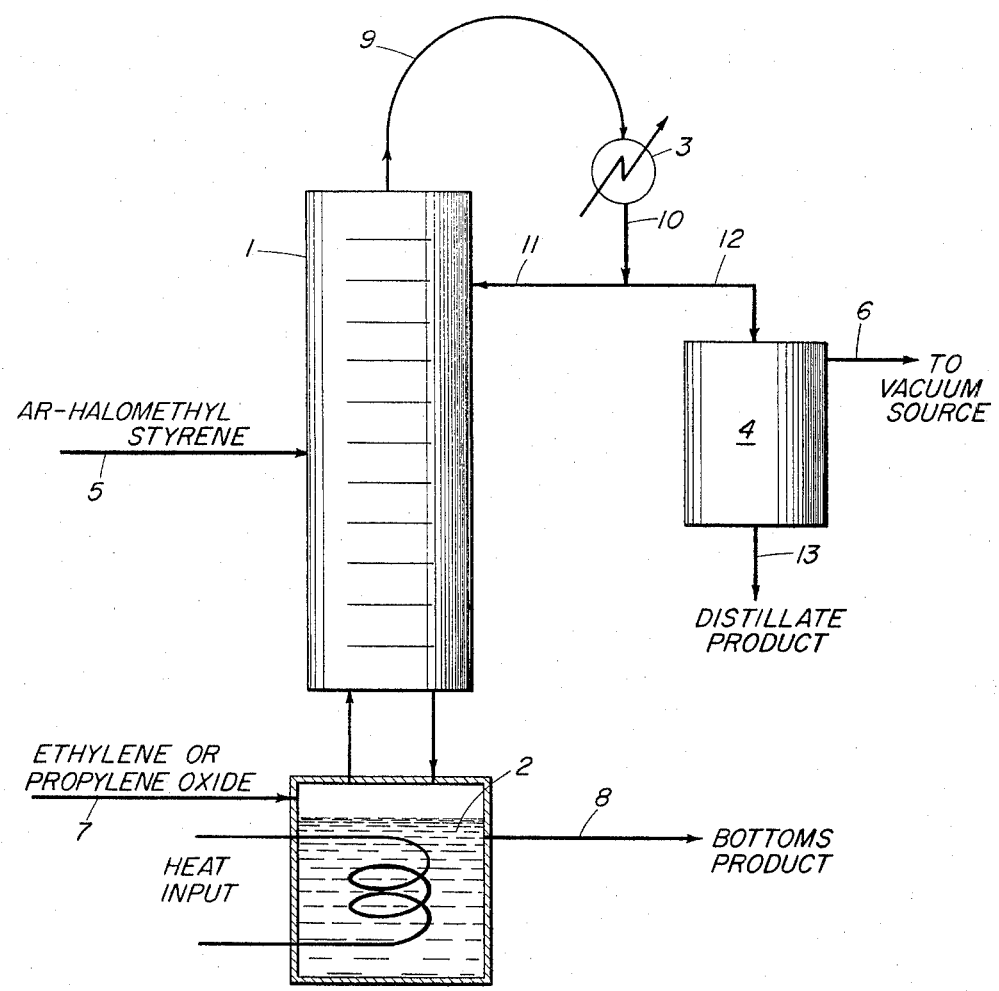

3,274,077
DISTILLATION OF CRUDE Ar-HALOMETHYL-
STYRENES IN PRESENCE OF AN ALKYLENE
OXIDE
David Solomon Hoffenberg, Norwalk, and Harry Francis
Cosway, Stamford, Conn., assignors to American
Cyanamid Company, Stamford, Conn., a corporation
of Maine
Filed Sept. 18, 1962, Ser. No. 224,517
8 Claims. (Cl. 203—8)

This invention relates to the purification of ar-halomethylstyrenes by an improved distillation method. More particularly, it relates to an improved distillation process wherein monomeric ar-halomethylstyrenes may be separated from crude mixtures contaminated with impurities having boiling points close to said ar-halomethylstyrenes.

Ar-halomethylstyrenes have heretofore found limited use for such things as the preparation of resinous polymers, as cross-linking agents and as comonomers in certain paper sizes. But wide commercial acceptance has not been the case for this class of styrenes and, one reason, perhaps, is the difficulty encountered in obtaining the individual styrenes in relatively pure form. At the present time, ar-halomethylstyrenes are commercially purified by distillation, and available, at best, in a purity of only about 95%. While the most feasible way to purify this material on a grand scale is by distillation under low vacuum conditions, due to the reactive nature of the desired compounds, impurities formed during distillation and impurities present from the synthesis reactions, this apparently simple distillation is extremely difficult, if not impossible. The difficulty arises because the ar-halomethylstyrenes, boiling at about 100° C. (10 mm. Hg), require distillation temperatures at which some higher boiling impurities such as the 1,2-di-halo-1-tolyl ethanes and ar-dihalomethylstyrenes, begin to evolve hydrogen halide gas spontaneously. This hydrogen halide, in a normal stainless steel distilling column, promotes the self-alkylation and polymerization of the ar-halomethylstyrene being distilled. The polymer formed in this manner is highly cross-linked and does not wash out of the column, but remains there, tends to proliferate, and in short order forms a solid obstruction in the distilling column. When this happens, the column is useless and must be shut down.

The approach heretofore taken toward solving this problem, involves distillation at a lower temperature than will cause the evolution of hydrogen halide. This is a possibility if distillation is carried out under very high vacuum conditions (e.g., 1 mm. Hg or lower). The great expense of maintaining such low pressures in commercial-sized columns, as will completely eliminate the problem, renders the "high vacuum" approach impractical. Use of lesser vacuum conditions, forestalls, but does not avert, eventual column fouling. The result of there not being available, a commercially feasible method of obtaining ar-halomethylstyrenes in a highly purified state, has been acceptance of lower standards of purity, and only limited use of the impure product.

It is an object of the present invention to provide a commercially useful means of obtaining ar-halomethylstyrenes in highly pure form. More particularly, it is an object of the present invention to provide a process whereby ar-halomethylstyrenes can be distilled without the aforementioned difficulties. Other objects will be made apparent hereinafter.

It has now been discovered that ar-halomethylstyrenes are readily purified by distillation under "normal" vacuum conditions, without the aforementioned difficulties, by conducting the distillation in the presence of ethylene oxide or propylene oxide using a column fabricated from, or lined with, a non-ferrous material and packed with either titanium or tantalum. Optionally and optimally, the distillation should be conducted in the presence of at least one nitroaromatic hydrocarbon or nitrophenol to inhibit polymerization, but this is not essential.

As employed in the present description, the term "ar-halomethylstyrenes" is intended to mean styrenes nuclearly substituted by at least one monohaloalkyl group. Up to three such groups may be present, and/or the styrene may have other nuclear substituents. Compounds of this type are disclosed in U.S. Patent 2,981,758, wherein they are prepared by a high temperature vapor phase halogenation of the corresponding ar-alkyl styrene compound. They include mono-, di- and tri-substituted ar-halomethylstyrenes with or without further ar-methyl and/or $\alpha$-methyl substituents. These may be represented by the formula:

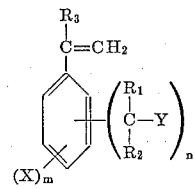

wherein $R_1$ and $R_2$ are individually either hydrogen, methyl or ethyl, each X is either halogen, cyano, aryl, alkyl, hydroxy, carboxy or aryloxy, $n$ is 1, 2 or 3, and $m$ is an integer in the range of 0 to $(5-n)$, $R_3$ is hydrogen or methyl and Y is halogen.

The present invention is eminently suitable for purifying the compounds mentioned in, and obtainable by the process of, said U.S. Patent 2,981,758, especially those wherein the ar-halomethyl substituent is ar-chloromethyl.

As noted above, one requisite of the present invention is to avoid contacting the crude material or vapor fractions thereof with ferrous surfaces. This end can be attained using a distilling column fabricated from, or lined with, any non-ferrous material normally employed in distilling columns. Included among these are glass, ceramic, titanium and inert, heat resistant polymeric materials. Of course, the packing in the column must likewise be made of a non-ferrous material. It has been found that most desirable for practice of the present invention are distillation columns lined with titanium or tantalum, packed with chips or fabricated packing of the same material.

The second requisite of the present invention is that the ar-halomethylstyrene be distilled in the presence of ethylene oxide or propylene oxide. While many materials are known which react with hydrogen halides, many such materials either do not react with sufficient rapidity or else the reaction which is undergone, is reversible so that under distillation conditions there is a sufficient concentration of hydrogen halides to promote the undesirable self-alkylation and polymerization reactions. Other materials give a product with hydrogen halide which is not volatile under distillation conditions, or else cannot be readily separated from the desired ar-halomethylstyrene distillate. But when ethylene oxide or propylene oxide is present during distillation in a concentration sufficient to take up the hydrogen halide produced during distillation, the latter is irreversibly bound to give a product which distills readily, but which can readily be isolated from the desired purified ar-halomethylstyrenes. In general, from about 0.005 to 2% of oxide, based on the weight of the crude material, effectively binds all hydrogen halide produced during distillation.

The efficiency of the distillation process of the present invention can be improved as compared to conventional methods, if distillation is conducted in the presence of at least one high temperature radical polymerization inhibitor. It is surprising that most known inhibitors of vinyl aromatics are not effective for the purposes of this invention. Either they are not sufficiently volatile to inhibit polymerization throughout the whole column or they are not readily separated from the ar-halomethylstyrene distillate. A class of inhibitors which has been found eminently suitable for the present invention includes carbocyclic nitro-aromatic compounds such as nitrobenzene and nitrophenols, e.g., nitrocresol, nitrophenol, dinitrophenol and dinitrocresol.

It is particularly advantageous, it has been found, to employ two volatile inhibitors of different volatilities within the aforementioned group of inhibitors. The first should be capable of coming overhead with the low boiling components such as excess ar-methylstyrenes and other low boiling impurities during stripping. The second inhibitor should have approximately the same volatility as the desired ar-halomethylstyrene. By using this combination, the monomeric ar-halomethylstyrene is inhibited against linear polymerization at all times. Suitable for use as the high volatility inhibitor is ortho-nitrophenol and the like, and suitable for use as the inhibitor having the same volatility as the desired product is 2-nitro-p-cresol, and the like. Useful concentrations of inhibitors are within the range of 0.001 to 5% by weight of the crude material to be distilled.

It is an advantage of the present invention that extremely high vacuums are not necessary, since even higher distillation temperatures than were heretofore employed, do not completely interfere with the operation of the distillation column. Using the process of the present invention, it is relatively simple to obtain ar-halomethylstyrenes substantially free of non-polymerizable aromatic compounds which inhibit and stop polymerization of the ar-halomethylstyrene. Employing the pure material obtained from the process of the present invention, it is thereby made possible to obtain polymerization products of higher molecular weight and greater utility than could be obtained using the heretofore available ar-halomethylstyrene.

The sole figure of the accompanying illustration depicts one embodiment of apparatus suitable for performing the process of the present invention. Referring to the drawing, such apparatus is comprised essentially of a distillation column 1 fabricated from and packed with a non-ferrous material, a reboiler 2 also fabricated from non-ferrous material, a condenser 3 and a product receiver 4. It will be appreciated that the distillation can be carried out either batch-wise or on a continuous basis. From the standpoint of ease of operation and yield of purified product, continuous operation is superior to batch operation and is, therefore, preferred. In a continuous distillation (as in Example 7 herebelow) a feed stream 5 comprising the crude ar-halomethylstyrene, premixed with 0–5% of a liquid phase polymerization inhibitor, such as o-nitrophenol and/or 2-nitro-p-cresol, is fed continuously to the distillation column 1 which operates under vacuum suitably supplied through line 6. Ethylene oxide or propylene oxide is fed into the vapor space in the reboiler 2 through line 7 to inhibit vapor phase polymerization within the distillation equipment. Heat is supplied to the liquid in the reboiler 2 and the distillation proceeds in a manner well known to the art to provide a liquid bottoms product which is withdrawn through line 8 and a vapor product which is taken off through line 9 and condensed in the condenser 3. The liquified overhead product is removed through line 10 and separated into two streams, one of which is returned via line 11 as reflux to the distillation column 1 and the other passed through line 12 to product receiver 4. At suitable intervals, the product receiver 4 is drained and the distillate product recovered through line 13.

The invention is further illustrated by the following examples.

*Example 1*

Into a reactor maintained at 550° C. are introduced two separate gaseous streams. The organic stream contains 9 mole percent of ar-methylstyrene (70% meta isomer and 30% para isomer) and 91 mole percent steam which had been preheated to 525° C. The methylstyrene-steam feed is allowed to mix at 550° C. with a second stream of chlorine similarly diluted and similarly pre- TABLE I
[Products resulting from the chlorination of ar-methylstyrene (70% meta, 30% para)]

| Component | Structural Formula | Empirical Formula | Weight Percent Concentration | Boiling Point, ° C. | | |
|---|---|---|---|---|---|---|
| | | | | 5 mm. | 10 mm. | 20 mm. |
| 1. Ar-methylstyrene | ⌬—CH=CH₂, CH₃ | $C_9H_{10}$ | 36.6 | 43 | 55 | 65 |
| 2. α-Chloro ar-methylstyrene | ⌬—CCl=CH₂, CH₃ | $C_9H_9Cl$ | 5.2 | 80 | 93 | 106 |
| 3. Ar-chloromethylstyrene | ⌬—CH=CH₂, CH₂Cl | $C_9H_9Cl$ | 42.3 | 89 | 100 | 113 |
| 4. 1,2-dichloro, 1-tolylethane | ⌬—CHCl—CH₂Cl, CH₃ | $C_9H_{10}Cl_2$ | 7.0 | 101 | 113 | 130 |
| 5. Ar-dichloromethylstyrene | ⌬—CH=CH₂, CHCl₂ | $C_9H_8Cl_2$ | 4.0 | 100 | 112 | 127 |
| 6–9. Tri and tetra chlorinated products | | $C_9H_{8-10}Cl_{3-4}$ | 7.4 | | | | heated. The mole ratio of methylstyrene to chlorine is 2:1, and the residence time of the reaction stream in the reactor is 0.7 second. The effluent gases are condensed and the aqueous phase separated from the organic phase by gravity.

Analysis of the organic product by gas-liquid chromatography indicated the presence of at least nine components in varying amounts. By means of a preparative gas-liquid chromatography column, most were separated, identified, and their vapor pressures measured. The materials, their weight percent concentrations, their structural and empirical formulae and boiling points at several pressures are tabulated in Table I.

Example 2

On the basis of the boiling points shown in Table I, it was calculated that a column of 15-20 theoretical plate efficiency was required to achieve 98+% pure ar-chloromethylstyrene in recoveries of up to 85-95% of that present in the reactor product.

For the distillation, a 1" x 6' long glass column with a reflux return head was set up for adiabatic distillation, and packed with ¼" x ¼" titanium packing. To the feed was added 0.5 part by weight of o-nitrophenol (B.P. at 10 mm. Hg pressure=93° C.), and 0.5 part by weight of 2-nitro p-cresol (B.P. at 10 mm. Hg pressure=108° C.). The feed stock was then charged to the distilling flask (reboiler) which was constructed so that a gas could be admitted to the system at a point just above the boiling liquid and yet below the packing material of the column. Ethylene oxide was fed into the column at this point at the rate of 0.05 part per part initial charge per hour.

The distillation was then carried out at a head pressure of 10.0 mm. of Hg and at a reflux ratio of 3:1. The pressure drop through the column was 22 mm. of Hg pressure. The results of this distillation are shown in Table II.

Example 4

The distillation, as described in Example 2, was repeated under essentially the same conditions except that a known polymerization inhibitor, nitric oxide (NO) was used in place of ethylene oxide. The results were essentially the same as those described in Example 3.

Example 5

The distillation, as described in Example 2, was repeated under essentially the same conditions except that in this case trimethylamine was used in place of ethylene oxide. After about 15% of the charge had been taken overhead, a deposit of white crystalline material was observed in the lower portions of the column. By the time 25% of the charge had been distilled, the pressure drop had increased to 60 mm. and was rising rapidly. The distillation had to be discontinued. The yield of ar-chloromethylstyrene achieved in this distillation was 0%.

Example 6

The distillation, as described in Example 2, was repeated under essentially the same conditions, including the use of ethylene oxide, but in this case stainless steel "Canon" packing was substituted for the titanium packing. After about 30% of the charge had been taken overhead, several spots were observed in the column where the boiling liquid was red in color. Soon after this, an increase in the pressure drop through the column was observed and the red areas increased in size and the liquid in them became more viscous. Before 45% of the initial charge could be taken overhead, the column became completely plugged and the distillation was discontinued. The column could not be cleaned using the normal polymer solvents including dimethylformamide and dimethylsulfoxide, and had to be discarded. The yield of ar-chloromethylstyrene in this case was about 4%.

TABLE II
[Results of distillation in Example 2]

| Fraction No. | Weight Percent of Charge | Composition of Fraction, Weight Percent Component [1] | | | | | | Weight Percent of Total Available Ar-Chloromethylstyrene |
|---|---|---|---|---|---|---|---|---|
| | | 1 | 2 | 3 | 4 | 5 | 6-9 | |
| 1 | 35 | 99 | 1 | | | | | 0 |
| 2 | 6 | 30 | 59 | 1 | | | | Nil |
| 3 | 3 | | 33 | 66 | | | | 2.4 |
| 4 | 38 | | 0.3 | 99.3 | 0.1 | 0.2 | | 90 |
| 5 | 6 | | | 15 | 30 | 55 | | 2.0 |
| Polymeric Residue in Reboiler | 11 | | | ([2]) | ([2]) | | | |
| Accumulation in Column | 0.5 | | | ([2]) | ([2]) | | | |
| Total | 99.5 | | | | | | | 94.4 |

[1] Refer to Table I for identification of components 1-9.
[2] Not analyzed.

When tantalum packing is used in place of titanium, essentially the same results are achieved.

Example 3

The distillation, as described in Example 2, was repeated under essentially the same conditions except that nitrogen was used in place of ethylene oxide. It proceeded normally until about 40% of the charge had been taken overhead. At that point, a slight increase in the pressure drop through the column was observed. When about 48% of the charge had been taken overhead, the pressure drop had increased from an initial 22 mm. of Hg pressure to 55 mm. of Hg pressure. The temperature in the reboiler had risen commensurably to 170° C. and a buildup of viscous polymer in the column was obvious. The distillation had to be discontinued and efforts to clean the column were futile. It had to be discarded. The yield of 99% pure ar-chloromethylstyrene in this case was 3%.

Example 7

(A) A large quantity (800 lbs.) of crude chloromethylstyrene was prepared employing the procedure of Example 1 except that the ar-methylstyrene to chlorine molar ratio was 3:1. Gas-liquid chromatographic analysis of this material gave the following composition:

Component: Wt. percent
1. Ar-methylstyrene _____ 69.0
2. α-Chloro ar-methylstyrene _____ 2.2
3. Ar-chloromethylstyrene _____ 26.5
4. 1,2-dichloro 1-tolyl ethane _____ 1.3
5. Ar-dichloromethyl styrene _____ 0.4
6-9. Tri and tetra chloro products _____ 0.4
Non volatiles _____ 0.2

(B) In order to isolate and purify the ar-chloromethylstyrene described in Example 7A, a 2" x 7' column, which could be operated in a continuous manner, was fabricated from glass and packed with ¼" x ¼" titanium "Canon" packing. The feed stock was inhibited with 0.5 wt. percent of o-nitrophenol and 0.5 wt. percent of 2-nitro p-cresol and ethylene oxide was fed into the vapor space between the reboiler and the column packing at the rate of 0.05 pound/hour. The product to be distilled was fed to the column at a point about 4 feet from the bottom of the column at a rate of 3 pounds/hr. The column then operated at a head pressure of 10 mm., a pressure drop of 19 mm. and a reflux ratio of 2.5:1 for 260 hours. There was obtained an overhead fraction of 563 pounds which, by gas-liquid chromatographic analysis, was shown to be composed of 538 pounds of ar-methylstyrene (100% of that charged), 4 pounds of o-nitrophenol (100% of that charged), 16 pounds of α-chloro ar-methylstyrene (91% of that charged) and 5 pounds of ar-chloromethylstyrene (2.3% of that charged). The "bottoms" fraction weighed 218 pounds and contained 91% ar-chloromethylstyrene.

The "bottoms" fraction was then fed to the distillation column operated essentially as described above for the first part of the distillation in which unreacted ar-methylstyrene is separated out. From this second distillation, which ran continuously for 70 hours without incident, there was taken overhead 194# of product which, by gas-liquid chromatographic analysis, was found to contain 1.1 pounds of α-chloro ar-methylstyrene (6% of that charged), 191.5 pounds of of ar-chloromethylstyrene (91.5% of that charged), 0.2 pound of ar-dichloromethylstyrene (6% of that charged) and 0.2 pound of 1,2-dichloro-1-tolylethane (2% of that charged). In addition there was 1.0 pound of 2-nitro ortho cresol in this fraction. The purity of ar-chloromethylstyrene obtained in this distillation was thus 99.3% on an inhibitor-free basis. The "bottoms" product, weighed 22 pounds and was discarded.

*Example 8*

When the distillation described in Example 7B is repeated except that a column fabricated from titanium is is used in place of the glass column, essentially the same result is realized.

We claim:
1. A process of purifying crude ar-halomethylstyrene to obtain the desired ar-halomethylstyrene product in greater than 95% purity, which comprises subjecting said crude material to vacuum distillation in a column fabricated from and packed with a non-ferrous material, said distillation being carried out in the presence of 0.005 to 2%, based on the weight of the crude material, of a member selected from the group consisting of ethylene oxide and propylene oxide and about 0–5%, based on the weight of the crude material, of a carbocyclic nitroaromatic compound.

2. The distillation process of claim 1 wherein the crude material contains, and the desired product is ar-chloromethylstyrene.

3. The process of claim 1 wherein the member is ethylene oxide.

4. The process of claim 1 wherein the carbocyclic nitroaromatic compound is selected from the group consisting of o-nitrophenol and 2-nitro-p-cresol.

5. The process of claim 1 wherein the column is fabricated from glass.

6. The process of claim 1 wherein the column is fabricated from a member selected from the group consisting of tantalum and titanium.

7. The process of claim 1 wherein the column is packed with packing material of a member selected from the group consisting of tantalum and titanium.

8. A process of purifying crude ar-chloromethylstyrene, said crude material containing other chlorine-containing components, which comprises subjecting the crude material to vacuum distillation in a distillation column whose inner surfaces are fabricated from a non-ferrous material and which is packed with a member selected from the group consisting of titanium packing and tantalum packing, said distillation being carried out in the presence of 0.005 to 2% of ethylene oxide; 0.001 to 5% of o-nitrophenol and 0.001 to 5% of 2-nitro-p-cresol based on the weight of the crude material.

References Cited by the Examiner

UNITED STATES PATENTS

| | | | |
|---|---|---|---|
| 2,526,567 | 10/1950 | Drake et al. | 203—9 X |
| 2,556,030 | 6/1951 | Coulter et al. | 203—9 |
| 2,789,803 | 4/1957 | Doty | 202—158 |
| 2,800,434 | 7/1957 | Howlett et al. | 203—86 |
| 2,967,699 | 1/1961 | Brown | 202—158 |
| 2,981,758 | 4/1961 | Hoffenberg | 260—649 |
| 3,100,232 | 8/1963 | Keith et al. | 260—649 |

NORMAN YUDKOFF, *Primary Examiner.*

W. L. BASCOMB, *Assistant Examiner.*